US009865140B2

(12) United States Patent
Bond et al.

(10) Patent No.: US 9,865,140 B2
(45) Date of Patent: *Jan. 9, 2018

(54) SYSTEMS AND METHODS OF ELECTRONIC GAMING

(71) Applicant: Aristocrat Technologies Australia Pty Limited, North Ryde (AU)

(72) Inventors: Anthony Wayne Bond, Las Vegas, NV (US); Stephen C. Jones, Henderson, NV (US); Philip Jeffrey Anderson, Las Vegas, NV (US); Scott Monroe Stewart, Las Vegas, NV (US); Gary Frerking, Henderson, NV (US)

(73) Assignee: Aristocrat Technologies Australia Pty Limited, Northy Ryde, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,212

(22) Filed: Oct. 11, 2016

(65) Prior Publication Data

US 2017/0032628 A1 Feb. 2, 2017

Related U.S. Application Data

(63) Continuation of application No. 14/744,936, filed on Jun. 19, 2015, now Pat. No. 9,466,184, which is a continuation of application No. 13/954,413, filed on Jul. 30, 2013, now abandoned, which is a continuation of application No. 12/631,270, filed on Dec. 4, 2009, now Pat. No. 8,517,815.

(60) Provisional application No. 61/120,244, filed on Dec. 5, 2008.

(51) Int. Cl.
*A63F 13/00* (2014.01)
*G07F 17/34* (2006.01)
*G07F 17/32* (2006.01)

(52) U.S. Cl.
CPC ............ *G07F 17/34* (2013.01); *G07F 17/326* (2013.01); *G07F 17/3209* (2013.01); *G07F 17/3213* (2013.01); *G07F 17/3225* (2013.01); *G07F 17/3244* (2013.01); *G07F 17/3246* (2013.01); *G07F 17/3251* (2013.01)

(58) Field of Classification Search
None
See application file for complete search history.

(56) References Cited

U.S. PATENT DOCUMENTS 5,106,091 A * 4/1992 Comito .............. A63F 3/00157 273/142 JA
6,988,731 B2 * 1/2006 Inoue ................. G07F 17/3213 273/138.2

(Continued)

*Primary Examiner* — Jason Yen
(74) *Attorney, Agent, or Firm* — Armstrong Teasdale LLP

(57) ABSTRACT

A gaming system is disclosed which includes a plurality of spinners, each spinner being associated with a plurality of display positions and having a plurality of symbols disposable at the display positions. A spinner controller is arranged to select the symbols to appear at the display positions for each spinner, and an outcome evaluator is arranged to determine whether the symbols shown at the display positions correspond to at least one winning outcome by reference to at least one defined win condition. Each win condition comprises a win line having at least three display positions from two adjacent spinners. A corresponding method of gaming is also disclosed.

21 Claims, 8 Drawing Sheets

(56) References Cited

U.S. PATENT DOCUMENTS

| | | | | |
|---|---|---|---|---|
| 7,448,948 | B2 * | 11/2008 | Hughs-Baird | G07F 17/32<br>273/138.1 |
| 8,388,436 | B2 | 3/2013 | Rodgers et al. | |
| 8,517,815 | B2 | 8/2013 | Bond et al. | |
| 9,466,184 | B2 | 10/2016 | Bond et al. | |
| 2003/0178768 | A1 * | 9/2003 | Luciano | A63F 5/00<br>273/142 HA |
| 2004/0162133 | A1 * | 8/2004 | Jackson | G07F 17/34<br>463/20 |
| 2004/0259627 | A1 | 12/2004 | Walker et al. | |
| 2005/0119039 | A1 * | 6/2005 | Berman | G07F 17/32<br>463/16 |
| 2006/0183532 | A1 * | 8/2006 | Jackson | G07F 17/3262<br>463/20 |
| 2007/0087806 | A1 | 4/2007 | Luciano et al. | |
| 2009/0227357 | A1 | 9/2009 | Rasmussen | |
| 2010/0113129 | A1 | 5/2010 | Nakamura | |
| 2013/0316780 | A1 | 11/2013 | Bond et al. | |

* cited by examiner

SYSTEMS AND METHODS OF ELECTRONIC GAMING

CROSS-REFERENCE TO RELATED APPLICATIONS

The present application claims the benefit of priority to U.S. patent application Ser. No. 14/744,936, filed on Jun. 19, 2015, entitled "A GAMING SYSTEM AND A METHOD OF GAMING,", which claims the benefit of priority to U.S. patent application Ser. No. 13/954,413, filed on Jul. 30, 2013, entitled "A GAMING SYSTEM AND A METHOD OF GAMING", which claims the benefit of priority from U.S. patent application Ser. No. 12/631,270, filed on Dec. 4, 2009, entitled "A GAMING SYSTEM AND A METHOD OF GAMING", which claims the benefit of priority to U.S. Provisional Patent Application No. 61/120,244, filed on Dec. 5, 2008, entitled "A GAMING SYSTEM AND A METHOD OF GAMING", each of which is hereby incorporated by reference in its entirety for all purposes.

BACKGROUND

The subject matter of the present disclosure relates to a method of electronic gaming, an electronic gaming system, and an article of manufacture for electronic gaming. It is known to provide a gaming system that includes a game controller arranged to randomly display several symbols from a predetermined set of symbols and to determine a game outcome such as a game win based on the displayed symbols. In some arrangements, a win outcome is defined on the basis of occurrence of symbols along defined win lines preselected or selected by a player prior to display of symbols by the gaming system. Such gaming systems may commonly be implemented as a stepper machine provided with reels with each reel carrying several symbols of the set, or a video machine wherein selected symbols are displayed on virtual reels on a graphical display device. However, while such gaming systems provide users with enjoyment, a need exists for alternative gaming systems in order to maintain or increase player enjoyment.

SUMMARY

Systems, methods, and articles of manufacture for electronic gaming are disclosed. In a first aspect, a gaming system including a plurality of spinners is provided. Each spinner is associated with a plurality of display positions and has a plurality of symbols disposable at the display positions. The gaming system also includes a spinner controller arranged to select the symbols to appear at the display positions for each spinner. The gaming system further includes an outcome evaluator arranged to determine whether the symbols shown at the display positions correspond to at least one winning outcome by reference to at least one defined win condition. Each win condition includes a win line having at least three display positions from two adjacent spinners.

In a second aspect, a method of gaming is provided. The method includes providing a plurality of spinners, each spinner being associated with a plurality of display positions and having a plurality of symbols disposable at the display positions. The method also includes selecting the symbols to appear at the display positions for each spinner. The method further includes determining whether the symbols shown at the display positions correspond to at least one winning outcome by reference to at least one defined win condition.

Each win condition includes a win line having at least three display positions from two adjacent spinners. The method also includes allocating a prize to a player when a winning outcome exists.

In a third aspect, a non-transitory computer readable storage medium having computer readable program code embodied therein for causing a computer to operate in accordance with a gaming system in provided. The gaming system includes a plurality of spinners. Each spinner is associated with a plurality of display positions and has a plurality of symbols disposable at the display positions. The gaming system also includes a spinner controller arranged to select the symbols to appear at the display positions for each spinner. The gaming system further includes an outcome evaluator arranged to determine whether the symbols shown at the display positions correspond to at least one winning outcome by reference to at least one predefined combination of symbols. Each predefined combination of symbols includes a win line having at least three display positions from two adjacent spinners. The at least three display positions are in alignment with each other such that the win line is linear.

BRIEF DESCRIPTION OF THE DRAWINGS

Certain embodiments of the present invention will now be described, by way of example only, with reference to the accompanying drawings, in which.

Figure 1:
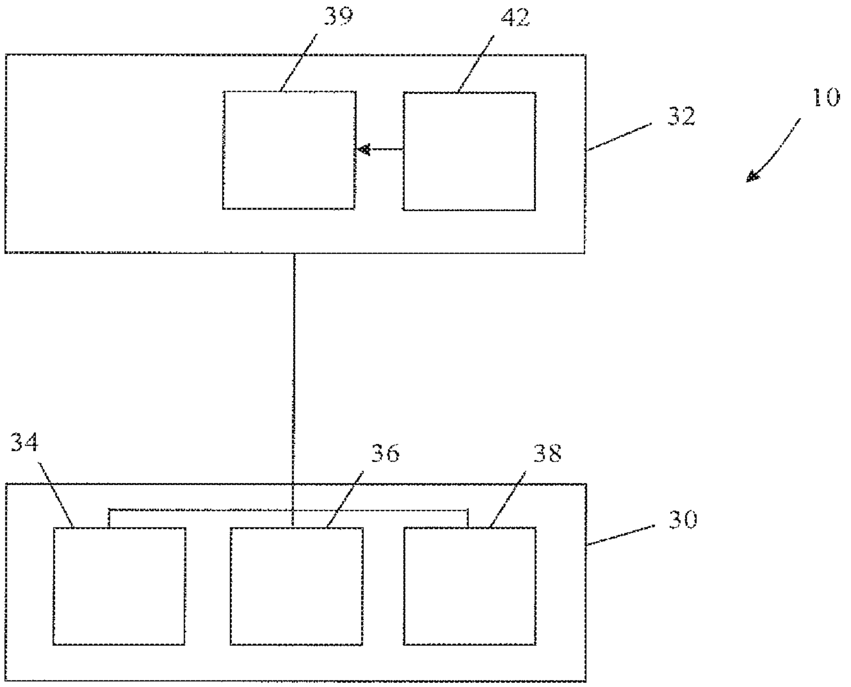
FIG. 1 is a schematic block diagram of core components of an exemplary gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, etc. storing the software and/or firmware.

Referring to the drawings, a method and a gaming system for implementing the method are shown. The present gaming system operates such that at least during a portion of a game implemented by the gaming system, the gaming system is arranged to display a plurality of spinners, each of which includes a plurality of symbols disposable in a respective plurality of display positions, and to spin and subsequently stop the spinners. Winning outcomes are determined by reference to at least one win condition, with each win condition including a win line having at least 3 display positions from an adjacent 2 spinners. The win lines may each include 3 or more display positions from 2 or more spinners, with winning outcomes and the awarded prizes being determined on the basis of the symbols disposed along the defined win lines after the spinners have stopped rotating.

In one embodiment, the gaming system is arranged to implement a base game, for example of the type including a plurality of symbol bearing reels, and a feature or special game which is triggered during a base game and that includes a plurality of symbol bearing spinners. However, the gaming system may implement a game with spinners only.

In the following embodiment, the gaming system is arranged to implement a base game and a feature game. The gaming system is configured to implement a probabilistic game where during normal game mode several symbols from a set of symbols are randomly displayed in a plurality of reels, and a game outcome is determined on the basis of the displayed symbols.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

FIG. 1 is a schematic diagram of core components of a gaming system 10 in accordance with the present embodiment is shown. The core components include a player interface 30 and a game controller 32. Player interface 30 is arranged to enable interaction between a player and the gaming system and includes input/output components for the player to enter instructions and play the game.

Components of player interface 30 include a credit mechanism 34 to enable a player to input credits and receive payouts, one or more displays 36 which may include a touch screen, and a game play mechanism 38 arranged to enable a player to input game play instructions.

Game controller 32 is in data communication with player interface 30 and typically includes a processor 39 arranged to process game play instructions and output game player outcomes to display 36. Typically, the game play instructions are stored as program code in a memory 42 that can also be hardwired. In this specification the term "processor" is used to refer generically to any device that can process game play instructions and may include a microprocessor, microcontroller, programmable logic device or other computational device such as a personal computer or a server.

Figure 2:
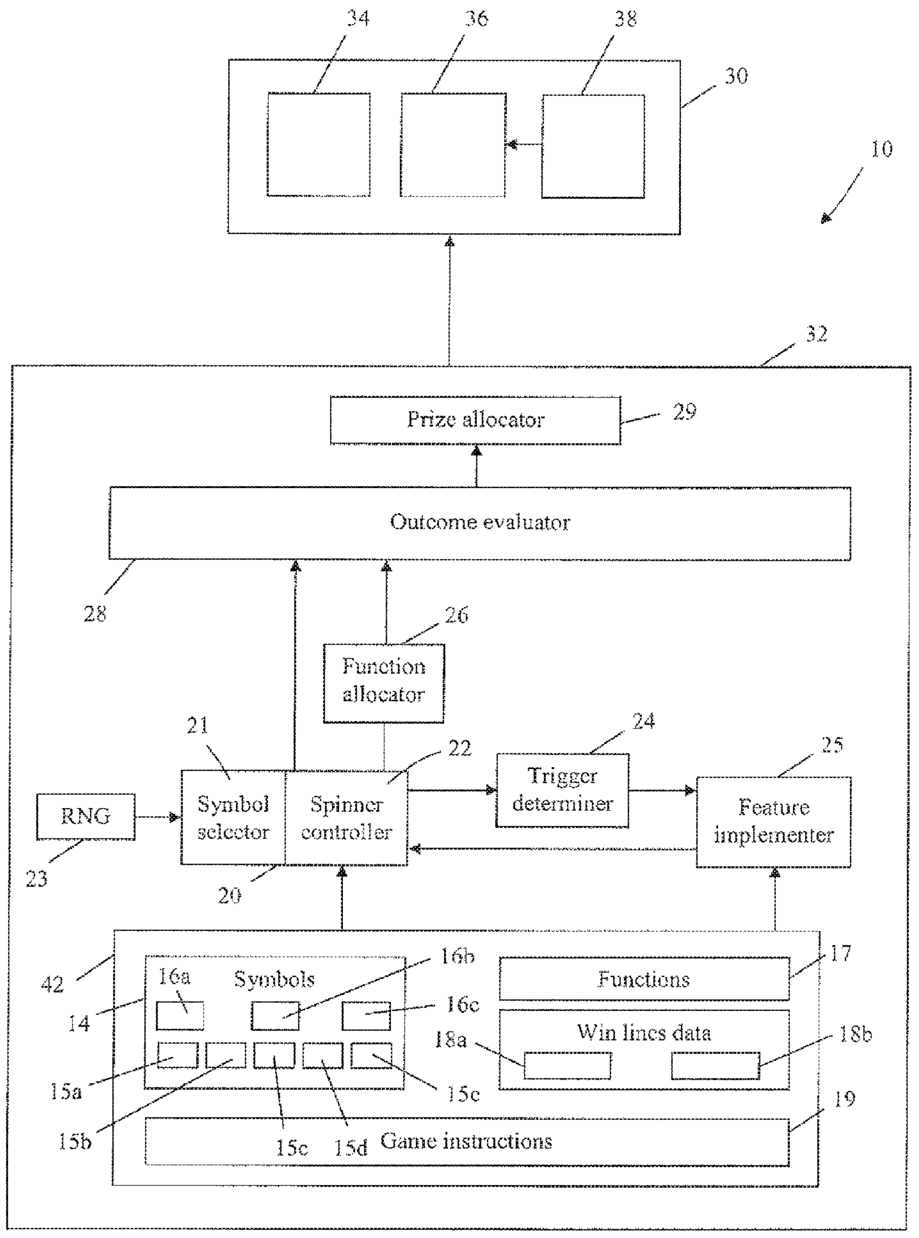
FIG. 2 is a schematic block diagram of functional components of an exemplary gaming system.

FIG. 2 is a functional diagram illustrating operative components of game controller 32. Memory 42 is arranged to store symbols data 14 indicative of a plurality of symbols. In the present example, since the gaming system is arranged to implement both a base game wherein a plurality of symbol bearing reels are provided and a feature game wherein a plurality of symbol bearing spinners are provided, the symbols 14 include base game symbols 15 associated with a plurality of reels, and feature game symbols 16 associated with a plurality of spinners. In this embodiment, each reel has a defined set of reel symbols **15*a*, 15*b*, 15*c*, 15*d*, 15*e* and each spinner had a defined set of spinner symbols 16*a*, 16*b*, 16*c***, although it will be understood that other variations are possible.

Memory 42 is also arranged to store base win lines data **18*a* indicative of win lines available during a base game and feature win lines data 18*b* indicative of win lines available during a feature game, function data 17 indicative of one or more functions allocatable to the symbols during a base game and/or a feature game, and game instruction data 19 indicative of game instructions usable by the gaming machine 40** to control operation of the game.

The game controller 32 also includes a selector 20 in this example having a symbol selector 21 and a spinner controller 22. During normal game mode wherein a base game is implemented, symbol selector 21 is arranged to select several symbols from the available symbols 15 for display to a player in a plurality of display positions. A plurality of symbol bearing reels are then spun and subsequently stopped so as to display at least one symbol on each reel.

During a feature or special game mode, spinner controller 22 is arranged to control a plurality of spinners so as to determine the relative display positions of the symbols on the spinners. This is represented on the display by spinning and subsequently stopping the spinners. In this example, during special game mode, each spinner has a defined set of symbols and the relative positions of the symbols after the spinners have stopped rotating determines whether a winning outcome exists with reference to one or more defined win conditions. In this example, the selection carried out by symbol selector 21 and the stopping positions of the spinners determined by spinner controller 22 are made using a random number generator 23.

It will be appreciated that random number generator 23 may be of a type which is arranged to generate pseudo random numbers based on a seed number, and that in this specification the term "random" will be understood accordingly to mean truly random or pseudo random.

With this embodiment, game controller 32 also includes a trigger determiner 24 arranged to determine whether a trigger condition exists and to instruct a feature implementer 25 to implement a feature or special game mode when a trigger condition has been detected. Such a trigger condition may be display of a particular symbol or combination of symbols, or any other game related event.

In this example, game controller 32 also includes a function allocator 26 arranged to select and allocate one or more functions to one or more symbols. Such functions include a wild function, a scatter function, or any other function which may be applied to a symbol or to the game. Game controller 32 also includes an outcome evaluator 28 which in accordance with game instructions 18 determines game outcomes based on the symbols selected for display to the player by symbol selector 21 and the relative positions of the symbols on the reels during a base game, and on the symbols and relative positions of the symbols on the spinners during a feature game. Game controller 32 also includes a prize allocator 29 arranged to allocate a prize to a player when a winning outcome exists, the type of prize being dependent on the particular winning outcome.

In the embodiments described below, symbol selector 21, trigger determiner 24, feature implementer 25, function allocator 26, outcome evaluator 28, and prize allocator 29 are at least partly implemented using processor 39 and associated software, although it will be understood that other implementations are envisaged.

Gaming system 10 can take a number of different forms. In a first form, a gaming machine is provided wherein all or most components to implement the game are present in a player operable gaming machine. In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

Player interface 30 include credit mechanism 34 to enable a player to input credits and receive payouts, one or more displays 36 which may include a touch screen, and game play mechanism 38 oriented to enable a player to input game play instructions.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in gaming machine mode, "thick client" mode or "thin client" mode depending on the game being played, operating conditions, and so on. Other variations will be apparent to persons skilled in the art.

Figure 3:
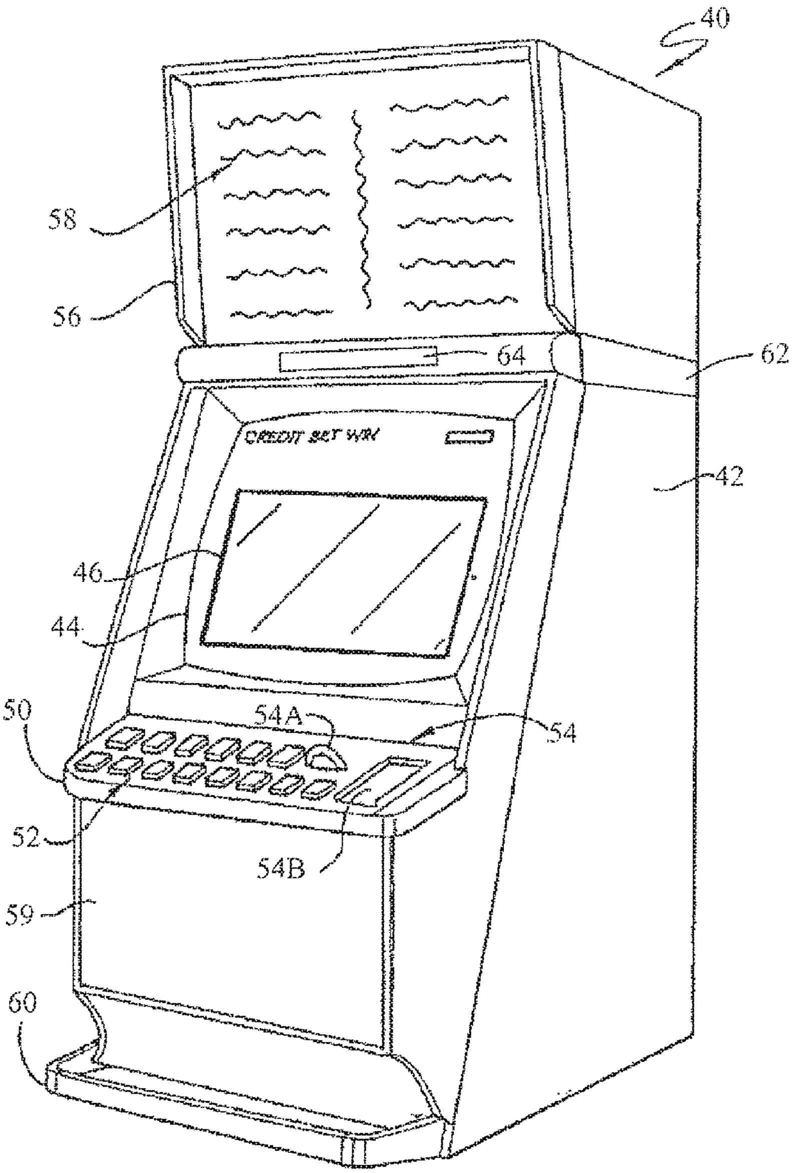
FIG. 3 is a diagrammatic representation of an exemplary gaming system implemented in the form of a gaming machine.

FIG. 3 is a perspective view of an exemplary gaming machine 40. Gaming machine 40 may include a support structure, housing, console or cabinet 42 that provides support for a plurality of interface units, displays, inputs, controls and other features of a conventional gaming machine. Gaming machine 40 may be configured so that a player can operate it while standing or sitting. Moreover, gaming machine 40 may be positioned on a base or stand, or can be configured as a pub-style table-top game (not shown) that a player can operate while seated. Gaming machine 40 may include varying numbers and styles of cabinets 42, display configurations, and the like without departing from the scope of the present disclosure.

In an exemplary embodiment, cabinet 42 has a display 44 that displays a game 46 that can be played by a player. In an exemplary embodiment, display 44 may be used interchangeably with display 36 (shown in FIG. 1). Gaming machine 40 may also include a mid-trim 50, which may house a bank of buttons 52 for enabling a player to interact with the gaming machine, in particular during game play. Mid-trim 50 also houses a credit input mechanism 54 that, in this example, includes a coin input chute 54A and a bill collector 54B. Other credit input mechanisms may also be employed, for example, a card reader for reading a smart card, debit card or credit card.

Gaming machine 40 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 40 and the player tracking device.

Gaming machine 40 may further include a top box 56, which may, in turn, include artwork 58, such as, for example, artwork depicting one or more pay tables, bonus award information, an upper display (not shown), and/or other game information or imagery. Further artwork and/or information may be provided on a front panel 59 of cabinet 42. A coin tray 60 may be mounted beneath front panel 59 for dispensing cash payouts from gaming machine 40.

Display 44 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 44 includes a touch-screen or touch-sensitive screen. In various embodiments, display 44 may be of any suitable size and configuration, such as any circular, square, rectangular, or other geometric configuration.

Display 44 may be further configured to provide haptic feedback. Top box 56 may also include a display, which may be of the same or different from display 44.

Display 44 may, in various embodiments, display a game and/or accept game play data from a player. Moreover, display 44 may also display information relating to an interactive game, wager triggering event, or wagering outcome. In an exemplary embodiment, an upper display (not shown) mounted in top box 56 may display any wagering outcome, any suitable secondary game associated or not associated with the interactive game, or any information relating to the interactive games. The upper display may also be configured to accept game play data from a player.

Display 44 may, in addition, serve as digital signage operable to advertise one or more games or other aspects of the gaming establishment. In an exemplary embodiment, gaming machine 40 may also include a credit or fund display (not shown), which may display a player's current number of credits, cash accumulated, account balance, an original number of credits the player funded the gaming machine with, or an equivalent of any of the aforementioned, and the like. Moreover, in an exemplary embodiment, display 44 may display an amount being wagered or a player's accumulated winnings.

In an exemplary embodiment, and as described in greater detail herein, display 44 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 44 may include any electromechanical device, such as one or more rotatable or spinning wheels, reels or dice, any of which may be configured to display at least one or a plurality of games or other suitable images, symbols or indicia.

A player marketing module (PMM) 62 having a display 64 is connected to the gaming machine 40. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel® III device produced by Aristocrat Technologies Pty Ltd.

Display 44, in this example, is arranged during normal game mode to display representations of several reels, each of which includes several associated symbols. Typically 3, 4 or 5 reels are provided. During operation of a base game, the reels first appear to rotate then stop with typically three symbols visible on each reel. Base game outcomes are determined on the basis of the visible symbols together with any special functions associated with the symbols.

In this embodiment, display 44 is also arranged during a feature of special game mode to display representations of several spinners, each of which has several associated symbols. Typically 3, 4, or 5 spinners are provided. During operation of the game, the spinners first appear to rotate then stop with typically all symbols visible on each spinner. Game outcomes are determined on the basis of the displayed symbols together with any special functions associated with the symbols, and with reference to defined win lines which span two or more spinners and include at least 3 symbol positions.

Figure 4:
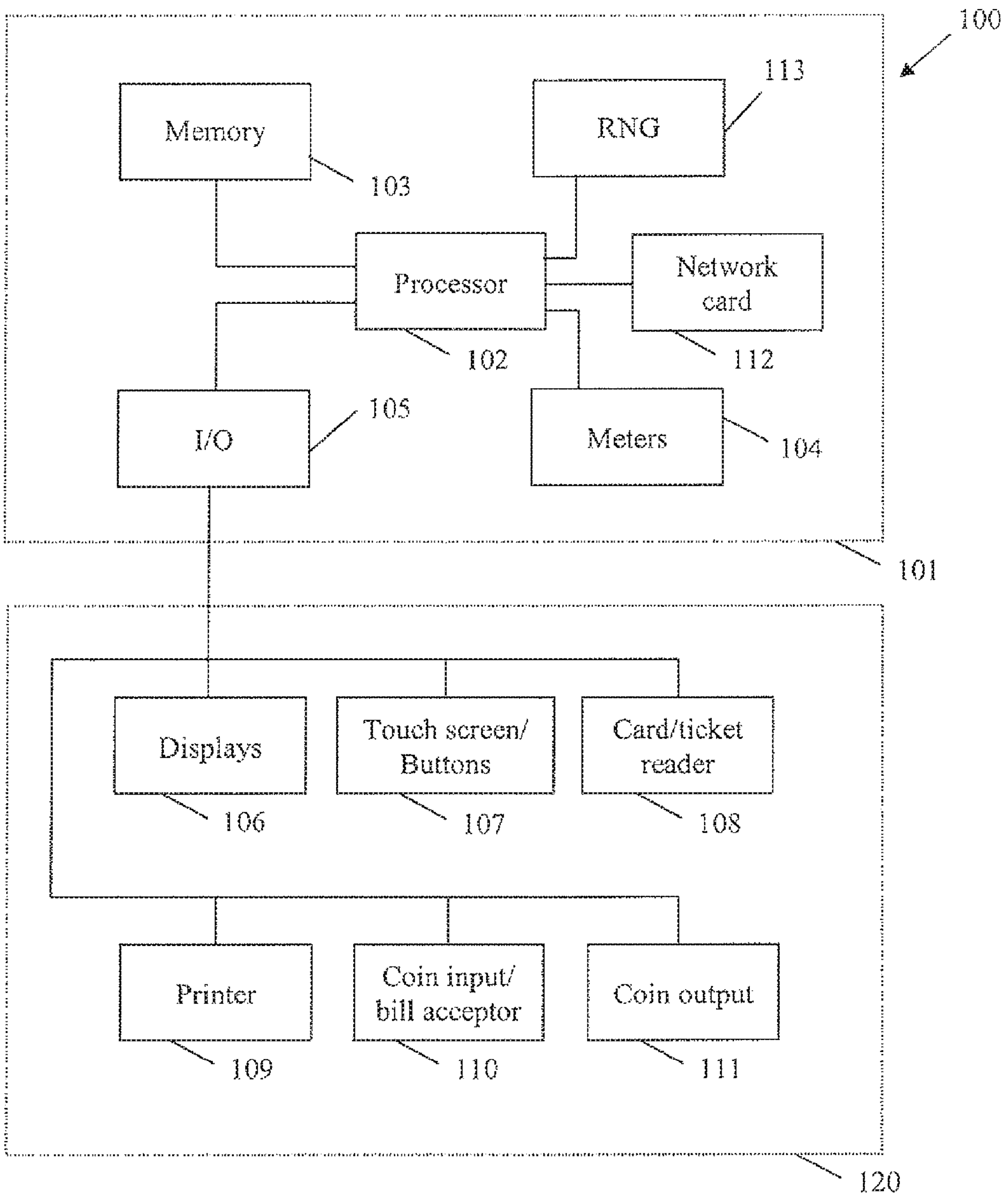
FIG. 4 is a schematic block diagram of operative components of the gaming machine shown in FIG. 3.

FIG. 4 illustrates a more detailed block diagram of various exemplary functional components of a gaming machine 100, which may be the same as, or different from, gaming machine 40 (as shown in FIG. 3). The foregoing description of components (e.g., display 106, player interface 50, and game controller 60) may therefore apply to the description of similar components in gaming machine 100. For instance, processor 39 may be the same as or different from 102, as described below. Similarly, memory 42 may be the same as or different from the memory 103, as described below.

Accordingly, gaming machine 100 may include a game controller 101 (which may include a processor 102 mounted on a circuit board, a described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may also include hardware meters 104 (to ensure regulatory compliance and to monitor player credit) and/or an input/output (I/O) interface 105 (for communicating with peripheral devices of gaming machine 100). Input/output interface 105 and/or the peripheral devices may include intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism receives a credit wager to initiate play of a base game, and establish a credit balance (e.g., using the received credit wager) that is increasable and decreasable based on wagering activity within a game. The payout mechanism is configured to output a payout to a player of gaming machine 100 based on an outcome of the game (e.g., a base game and/or a feature game).

Additional hardware may be included as part of gaming machine 100 or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 400 may be distributed. For example, in an embodiment, input/output devices 106, 107, 108, 109, 110, and 111 may be provided remotely from game controller 101.

Figure 5:
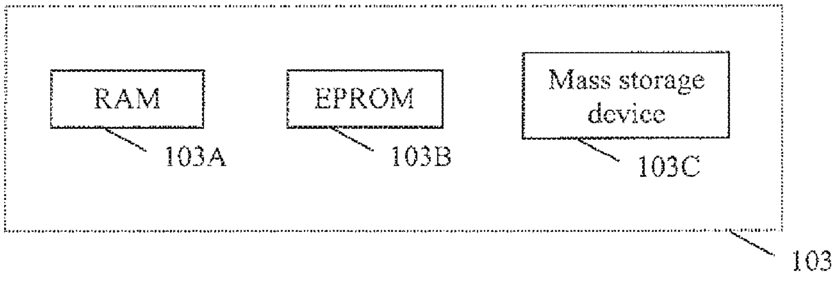
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

Figure 6:
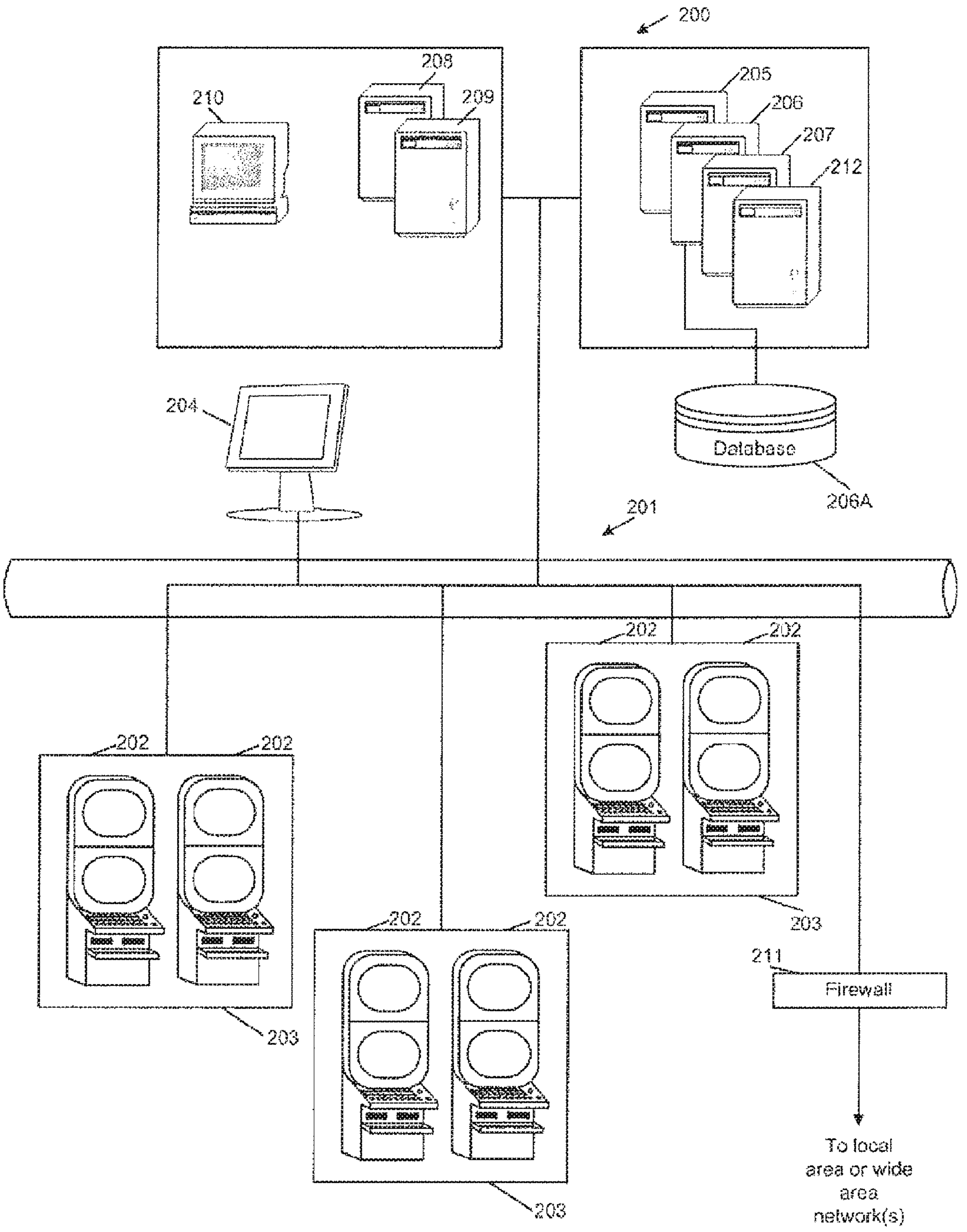
FIG. 6 is a schematic diagram of an alternative embodiment a gaming system implemented over a network.

FIG. 6 illustrates an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 40 and 100 (as shown in FIGS. 3 and 4), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 44 and/or display 106, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

Examples of specific implementations of the gaming system will now be described in relation to gaming machine 40, although it will be understood that implementation may also be carried out using other gaming system architectures such as a network architecture of the type shown in FIG. 6.

In this example, the gaming system is operable in a normal game mode and a special game mode. During the normal game mode, the gaming system uses five reels, each of which has an associated set of symbols. The reels include standard symbols and optionally one or more function symbols. Win outcomes are determined on the basis of the symbols visible at the display positions when the reels stop rotating. Typically, a player will purchase or otherwise obtain win entitlements such as several win lines which are used in the game to determine win outcomes. If the displayed symbols on the reels have symbols associated with a winning combination such as disposed on a win line, the player wins a prize.

The gaming system may be arranged to commence a special game mode when a predetermined game outcome occurs. The special game mode may include one or more free games. The special game mode may commence automatically on the basis of a game event occurring during a base game, such as display of a particular symbol, based on game outcomes determined by the gaming system, or may be prompted by a player pressing a button on the gaming system 10, 40, 100 after the player has identified that a game outcome corresponding to special game mode requirements has occurred.

The gaming system 10, 40, 100 may also be arranged so as to determine eligibility for a special game mode, for example based on the amount or type of bet placed, based on certain time periods and so on. A feature or special game mode may also be arranged to commence when a special game is purchased by a player.

Figure 7:
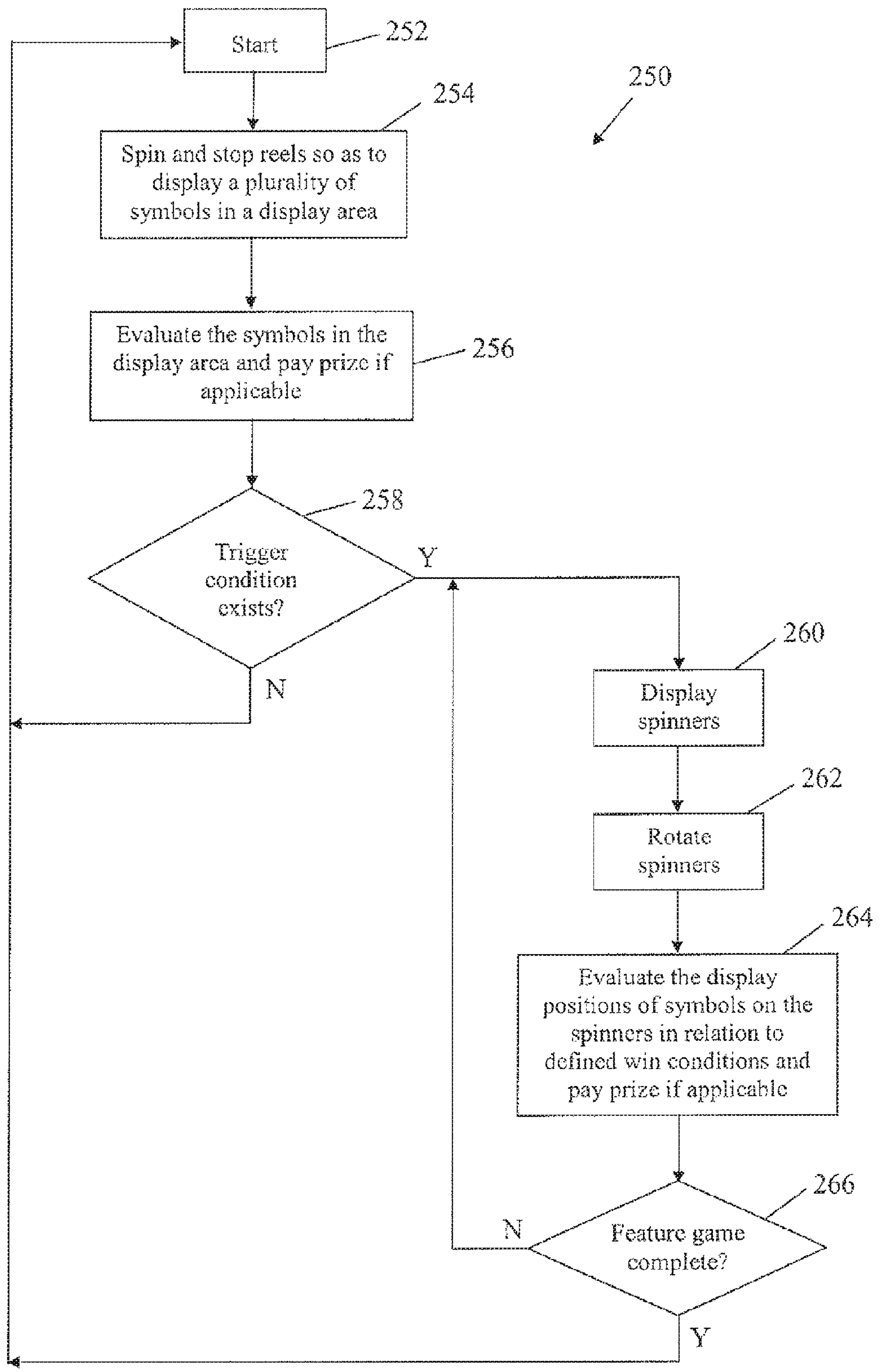
FIG. 7 is a flow diagram illustrating game play of an exemplary gaming system.

FIG. 7 is a flow diagram 250 illustrating an exemplary method of gaming implemented by a gaming system, such as gaming system 10 and/or gaming system 200. In the exemplary implementation, during normal game mode five virtual or stepper reels are provided and, as such, representations of the reels are displayed on a graphical display device 44. To initiate the game 252, the reels are spun 254 and subsequently stopped to display a symbol at each display position in a display area. Outcome evaluator 28 (shown in FIG. 2) evaluates 256 whether the symbols displayed at the display positions correspond to a winning outcome. If a trigger condition exists 258 (for example a special symbol or combination of symbols appearing at display device 44 (shown in FIG. 3), the feature or special game mode commences. Commencement of the special game mode causes a feature game to be implemented wherein a plurality of spinners are used instead of reels.

If a trigger condition exists, spinners (such as, for example, spinners 302, 304, and 306 shown in FIG. 8*a*) are displayed 260 at display 44 or at an additional display, such as a display in top box 56. The spinners are rotated 262 to an eventual stop position. Symbols 310 displayed on determined win lines 312*a-c* are evaluated 264 and if a win occurs the corresponding prize is provided to the player. The feature game may include other aspects such as, for example, multiple spins of one, several or all of spinners 302, 304, 306. The processor determines that the feature game is completed 266 and returns the game to the start of a new game.

FIG. 8 is an exemplary representation 300 of three spinners 302, 304, and 306 disposed relative to each other so as to define a generally triangular configuration. Each spinner has a plurality of associated display positions 308 and a plurality of symbols 310. Each symbol 310 is disposable in any one of display positions 308 by spinning and subsequently stopping spinner 302, 304, and 306.

The gaming system is configured such that a plurality of win lines 312*a-c* are defined between adjacent spinners, with each win line including at least three display positions and spanning at least two spinners. In the present example shown in FIG. 8*a*, three win lines are defined, each of which passes through the centers of rotation of an adjacent two spinners and each of which includes four display positions. However, it will be understood that any other win lines may alternatively or additionally be defined, including non-linear win lines, for example alternative win lines 314*a-c* as shown in FIG. 8*b*.

Figure 8A:
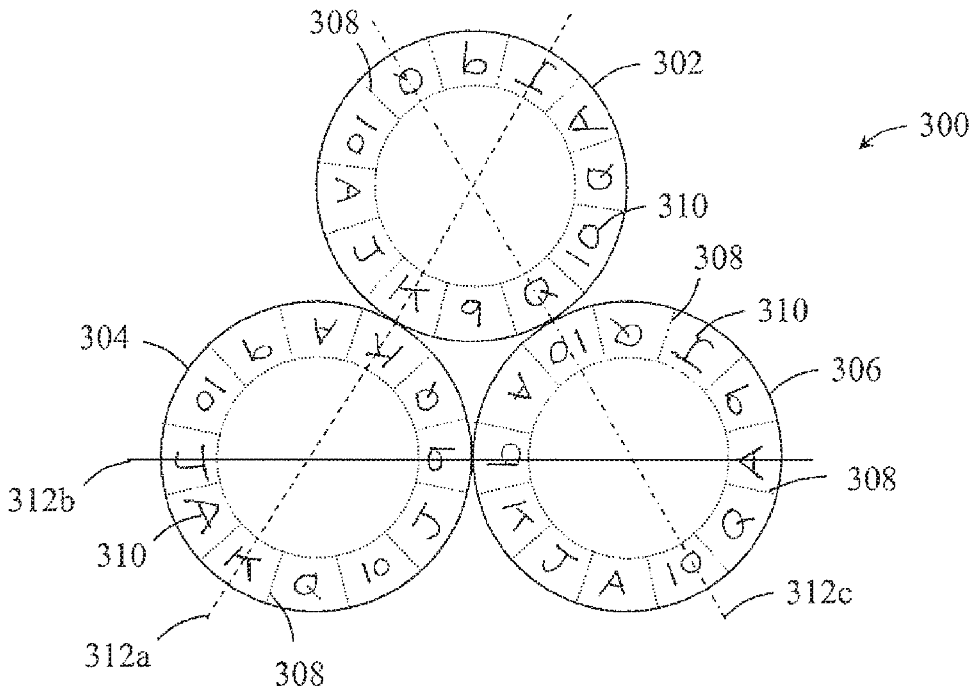
FIGS. 8*a* and 8*b* are diagrammatic representations of a screen displayed by an exemplary gaming system during implementation of a game and where 3 spinners are provided.
Figure 8B:
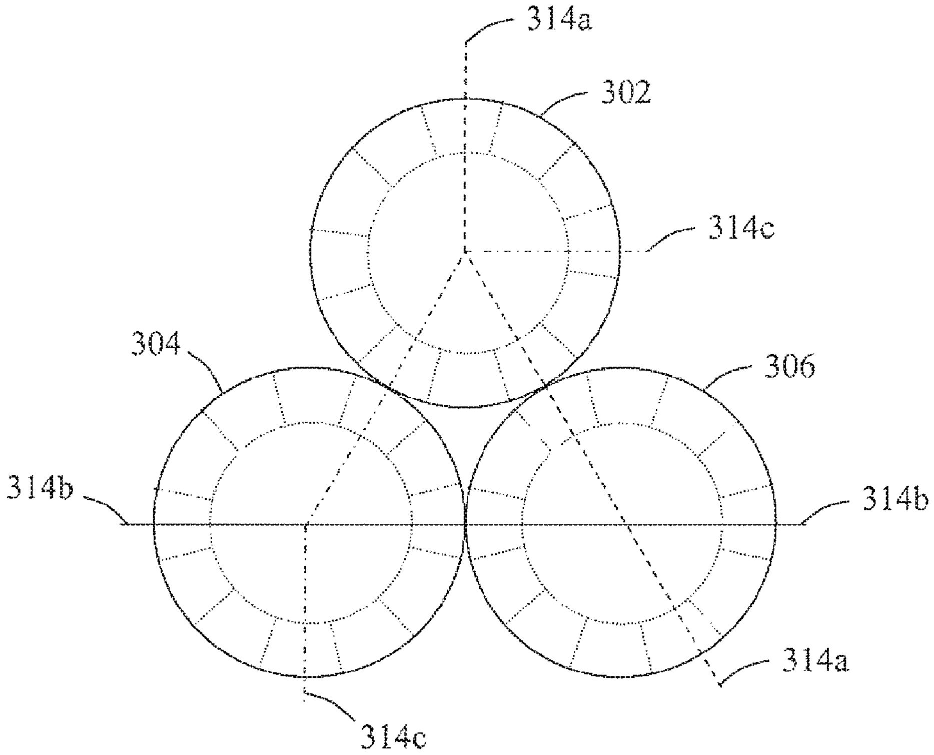

In the present example, FIG. 8*a* displays three King symbols present on a first win line 312*a* which equates to a winning outcome. It will be understood that winning outcomes may be based on any defined combination of symbols appearing along a win line or appearing on multiple win lines. For example, a winning outcome may be defined based on occurrence of a defined combination of symbols starting from a particular end of a win line, appearing anywhere on a win line, or as a scatter combination wherein at least three symbols appear on two or more win lines.

Figure 9:
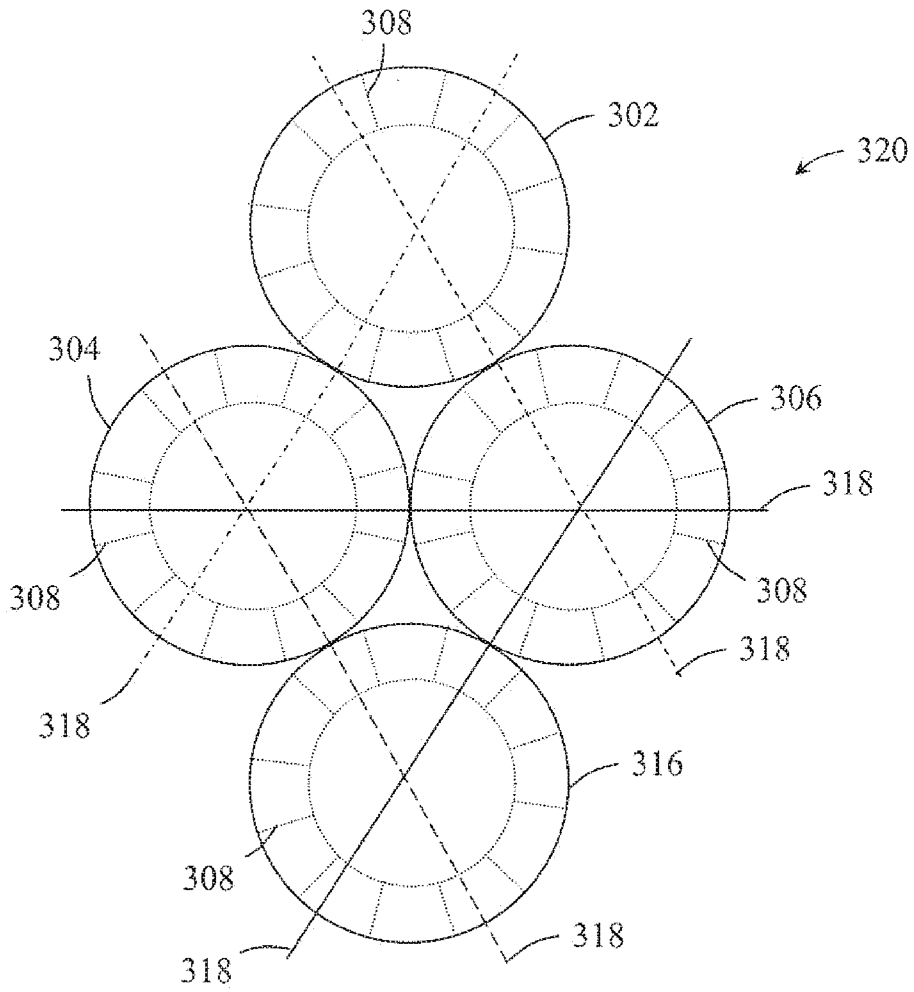
FIG. 9 is a diagrammatic representation of an alternative example screen displayed by a gaming system during implementation of a game and where 4 spinners are provided.

FIG. 9 is an alternative example representation 320 of four spinners 302, 304, 306, 316 which are disposed relative to each other so as to define a generally diamond shaped configuration. As with the embodiments shown in FIG. 8, each spinner has a plurality of associated display positions 308 and a plurality of symbols 310 (shown in FIG. 8*a*). Each symbol is disposable in any one of the display positions by spinning and subsequently stopping the spinner. With this embodiment, five win lines 318 are defined between adjacent spinners, with each win line including at least three display positions and each win line passing through the centers of rotation of an adjacent two spinners.

It will be understood that any plural number of spinners may be provided, where the spinners are used to define win lines having three or more display positions. It will also be understood that while in the present embodiment each spinner has a fixed set of associated symbols, other variations are possible. For example, the symbols associated with a spinner may change and/or may be selectable from a pool of common symbols. It will also be understood that a prize awarded to a player may be a monetary prize, may be in the form of a number of free games which may be feature games, or may be in any other suitable form.

While the above embodiments are described in relation to a gaming system which includes a display displaying a plurality of spinners, it will be understood that other variations are possible. For example, physical spinners may be provided.

Modifications and variations as would be apparent to a skilled addressee are deemed to be within the scope of the present invention.

One or more of the components of the systems and/or blocks of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method blocks and/or perform the blocks in a different order than the order listed. For example, some blocks may not be performed in certain embodiments of the present invention. As a further example, certain blocks may be performed in a different temporal order, including simultaneously, than listed above.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Examples can be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples can also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A gaming system comprising:

a credit mechanism configured to receive a credit input from a player for play of a base game, wherein the credit mechanism includes at least one of a coin acceptor, a bill acceptor, a card reader, and a ticket reader;

a display configured to present the base game to the player;

a plurality of non-concentric spinners, each spinner of the plurality of non-concentric spinners comprising a plurality of display positions and having a plurality of symbols displayable at the plurality of display positions; and a game controller configured to:

establish a credit balance associated with the player based on the received credit input, wherein a wager associated with the player is deducted from the credit balance;

conduct the base game in response to a wager from the first player, wherein a spinner game initiates upon an occurrence of a trigger condition in the base game; and determine whether selected symbols of the plurality of symbols displayed at the plurality of display positions for each spinner during the spinner game correspond to at least one winning outcome by reference to at least one predefined combination of symbols, each predefined combination of symbols comprising a win line extending through respective centers of rotation of two adjacent spinners of the plurality of non-concentric spinners, the win line including two display positions from each of the two adjacent spinners.

2. The gaming system in accordance with claim 1, wherein the game controller is further configured to allocate a prize to the player when a winning outcome of the at least one winning outcome is determined.

3. The gaming system in accordance with claim 1, wherein each spinner of the plurality of non-concentric spinners includes a respective set of associated symbols.

4. The gaming system in accordance with claim 3, wherein the respective set of associated symbols is displayed on each spinner in a predefined configuration.

5. The gaming system in accordance with claim 3, wherein each spinner of the plurality of non-concentric spinners includes a plurality of sets of associated symbols, each set of associated symbols of the plurality of sets selectably displayable on the spinner.

6. The gaming system in accordance with claim 1, wherein at least one win line is defined for each two adjacently disposed spinners of the plurality of non-concentric spinners.

7. The gaming system in accordance with claim 6, wherein each win line of the at least one win line comprises at least three display positions.

8. The gaming system in accordance with claim 1, further comprising a plurality of win lines wherein at least one win line of the plurality of win lines is non-linear.

9. The gaming system in accordance with claim 1, wherein the plurality of non-concentric spinners include at least three spinners disposed in one of a triangular configuration and a diamond shaped configuration.

10. The gaming system in accordance with claim 1, wherein the trigger condition including at least one of display of a particular symbol, player input, an amount or a type of wager placed, and a special game is purchased by the player.

11. A method of gaming comprising:

receiving, at a credit input mechanism, a credit input from a player for play of a base game, wherein the credit mechanism includes at least one of a coin acceptor, a bill acceptor, a card reader, and a ticket reader;

establishing, by a processor, a credit balance associated with the player based on the received credit input, wherein a wager associated with the player is deducted from the credit balance;

in response to receiving the wager from the first player, conducting, by the processor, the base game, wherein a spinner game initiates upon an occurrence of a trigger condition in the base game;

providing a plurality of non-concentric spinners, each spinner of the plurality of non-concentric spinners comprising a plurality of display positions and having a plurality of symbols displayable at the plurality of display positions; and determining, by the processor, whether selected symbols of the plurality of symbols displayed at the plurality of display positions for each spinner during the spinner game correspond to at least one winning outcome by reference to at least one predefined combination of symbols, each predefined combination of symbols comprising a win line extending through respective centers of rotation of two adjacent spinners of the plurality of non-concentric spinners, the win line including two display positions from each of the two adjacent spinners.

12. The method in accordance with claim 11 further comprising allocating a prize to the player when a winning outcome of the at least one winning outcome is determined.

13. The method in accordance with claim 11, wherein providing the plurality of non-concentric spinners further comprises providing a respective set of associated symbols for each spinner of the plurality of non-concentric spinners.

14. The method in accordance with claim 13 further comprising displaying the respective set of associated symbols on each spinner in a predefined configuration.

15. The method in accordance with claim 13, wherein each spinner of the plurality of non-concentric spinners includes a plurality of sets of associated symbols, each set of associated symbols of the plurality of sets selectably displayable on the spinner.

16. The method in accordance with claim 11, wherein at least one win line is defined for each two adjacently disposed spinners of the plurality of non-concentric spinners.

17. The method in accordance with claim 16, wherein each win line of the at least one win line comprises at least three display positions.

18. The method in accordance with claim 11, wherein at least one non-liner win line is defined.

19. The method in accordance with claim 11, wherein providing the plurality of non-concentric spinners further comprises disposing at least three spinners of the plurality of non-concentric spinners in one of a triangular configuration and a diamond shaped configuration.

20. The method in accordance with claim 11, wherein the trigger condition including at least one of display of a particular symbol, player input, an amount or a type of wager placed, and a special game is purchased by the player.

21. A non-transitory computer readable storage medium having computer-readable instructions stored thereon, wherein the computer-readable instructions, when executed by a processor, cause the processor to:

establish a credit balance associated with the player based on a credit input received by a credit input mechanism, the credit input mechanism including at least one of a coin acceptor, a bill acceptor, a card reader, and a ticket reader;

receive a wager from the first player for play of the base game, wherein the wager is deducted from the credit balance;

conduct the base game in response to the wager, wherein a spinner game initiates upon an occurrence of a trigger condition in the base game;

provide a plurality of non-concentric spinners to a display, each spinner of the plurality of non-concentric spinners comprising a plurality of display positions and having a plurality of symbols displayable at the plurality of display positions; and determine whether selected symbols of the plurality of symbols displayed at the plurality of display positions for each spinner during the spinner game correspond to at least one winning outcome by reference to at least one predefined combination of symbols, each predefined combination of symbols comprising a win line extending through respective centers of rotation of two adjacent spinners of the plurality of non-concentric spinners, the win line including two display positions from each of the two adjacent spinners.

* * * * *